United States Patent

Bray

[11] Patent Number: 6,166,780
[45] Date of Patent: Dec. 26, 2000

[54] AUTOMATED LANGUAGE FILTER

[75] Inventor: James R Bray, Rogers, Ark.

[73] Assignee: Principle Solutions, Inc., Rogers, Ark.

[21] Appl. No.: 08/954,950

[22] Filed: Oct. 21, 1997

[51] Int. Cl.$^7$ .................................................. H04N 3/24
[52] U.S. Cl. ........................ 348/632; 348/633; 348/468; 348/5.5; 704/275
[58] Field of Search .................. 348/460, 468, 348/5.5, 478, 482–485, 906, 632, 633, 907; 380/20; 704/275, 278, 251, 270; H04N 3/24

[56] References Cited

U.S. PATENT DOCUMENTS

| | | | |
|---|---|---|---|
| 4,305,101 | 12/1981 | Yarbrough et al. | 360/69 |
| 4,404,566 | 9/1983 | Clark et al. | 346/1.1 |
| 4,605,973 | 8/1986 | Von Kohorn | 358/335 |
| 4,739,398 | 4/1988 | Thomas et al. | 358/84 |
| 4,750,213 | 6/1988 | Novak | 455/67 |
| 5,189,630 | 2/1993 | Barstow et al. | 364/514 |
| 5,343,251 | 8/1994 | Nafeh | 348/571 |
| 5,371,795 | 12/1994 | Vogel | 380/23 |
| 5,418,621 | 5/1995 | Park | 358/335 |
| 5,434,678 | 7/1995 | Abecassis | 358/342 |
| 5,446,488 | 8/1995 | Vogel | 348/3 |
| 5,485,219 | 1/1996 | Woo | 348/460 |
| 5,508,731 | 4/1996 | Kohorn | 348/1 |
| 5,555,441 | 9/1996 | Haddad | 455/4.2 |
| 5,561,457 | 10/1996 | Cragun et al. | 348/13 |
| 5,589,945 | 12/1996 | Abecassis | 386/83 |
| 5,610,653 | 3/1997 | Abecassis | 348/110 |
| 5,634,849 | 6/1997 | Abecassis | 463/30 |
| 5,664,046 | 9/1997 | Abecassis | 386/125 |
| 5,668,917 | 9/1997 | Lewine | 386/52 |
| 5,684,918 | 11/1997 | Abecassis | 386/83 |
| 5,692,093 | 11/1997 | Iggulden et al. | 386/46 |
| 5,696,866 | 12/1997 | Iggulden et al. | 386/46 |
| 5,696,869 | 12/1997 | Abecassis | 386/52 |
| 5,697,844 | 12/1997 | Von Kohorn | 463/40 |
| 5,703,655 | 12/1997 | Corey et al. | 348/468 |
| 5,713,795 | 2/1998 | Kohorn | 463/17 |
| 5,717,814 | 2/1998 | Abecassis | 386/46 |
| 5,724,472 | 3/1998 | Abecassis | 386/52 |
| 5,751,335 | 5/1998 | Shintani | 348/460 |
| 5,759,101 | 6/1998 | Von Kohorn | 463/40 |
| 5,778,135 | 7/1998 | Ottesen et al. | 386/52 |
| 5,784,522 | 7/1998 | Yamamura | 386/46 |
| 5,813,010 | 9/1998 | Kurano et al. | 707/100 |
| 5,828,402 | 10/1998 | Collings | 348/5.5 |
| 5,835,843 | 11/1998 | Haddad | 455/4.2 |

*Primary Examiner*—Michael Lee
*Attorney, Agent, or Firm*—Head, Johnson & Kachigian

[57] ABSTRACT

A method and apparatus for analyzing the closed captioned aspect of a video signal for specific undesirable words or phrases and then muting the audio portion of those words or phrases while not affecting the video portion therein while simultaneously modifying the closed captioned signal in order to display only acceptable words or phrases.

15 Claims, 2 Drawing Sheets

AUTOMATED LANGUAGE FILTER

FIELD OF THE INVENTION

This invention relates to a muting device used in conjunction with electronic signals such as television broadcast, signals from videocassette recorders, etc. More specifically, to a device which utilizes the closed caption signal which is imbedded within the video portion of a television or video signal to identify specific words or phrases. Once an undesirable word or phrase is detected, the invention would then mute the audio portion of the signal without altering the video portion of the television broadcast signal. Further, the closed caption signal is modified in that the offending word is removed from the signal. An acceptable word or phrase may then be inserted in the place of the offensive word.

BACKGROUND OF THE INVENTION

Television communications over the years has become an everyday part of existence in the United States and abroad. These communications include a wide range of words and phrases. Some of the viewers of these communications would prefer that some specific words or phrases not be utilized. Viewers of these programs would like to view these programs but without having to be exposed to undesirable words or phrases. In order to meet this need, the viewing audience needs a means for automatically identifying specific words and/or related phrases and muting such words or phrases without affecting the video portion of the television or video signal.

U.S. Pat. No. 5,485,518 by Hunter, et al, discloses a method and apparatus for the recognition of electronic television broadcast programming and for a choice among available programs. It allows the user to lock out or block out all programs that have not been determined to be suitable to be viewed by all family members. These types of parental control devices work off principles of the time and codes. The devices block a television signal, both video and audio portions, during specific time frames and which have specific rating pursuant to an established rating code. This type of device does not allow the viewer to view the program.

The other line of prior art relates to the splitting of the audio and video portions of the television broadcast signal. U.S. Pat. No. 5,408,273 for Okamura discloses a circuit which allows the closed captioned data contained within the video portion of the television signal to be displayed whenever the muting function of the audio portion of the signal has been activated (see also U.S. Pat. No. 5,327,176 for Foyler, et al). This device focuses on displaying the closed captioned data when the audio portion of a signal is muted. This device is an aid when the viewer manually activates the muting function of a television set. It does not act as a monitor of the content of the video portion of the television signal.

The ability to choose what is appropriate for the family is becoming more and more important. Prior art discloses either a method of blocking out an entire program and thus missing important information or by manually muting the audio portion and displaying the closed captioned text, the closed-captioned data would still include, and thus display specific undesired information on the screen. There is a need in which to mute specific words or phrases while at the same time not affecting the video portion of the signal while displaying a modified closed caption signal.

SUMMARY OF THE INVENTION

The present invention is directed to a method and apparatus for processing a television or video signal in which the closed-captioned data contained within the video portion of the signal is analyzed for specific words or phrases. The present invention then mutes those words or phrases from the audio signal while not affecting the corresponding video image portion of the incoming signal. The device will then strip the identified word or phrase from the closed captioned signal, and it may replace it with another word or phrase. The modified closed caption segment may or may not be displayed depending on the devices settings. The mute is disabled when the closed caption command code to erase the modified closed captioned segment is received.

The present invention provides a variety of advantages over the prior art. One object of the invention is to allow parental control over the content of the television signals without necessarily blocking the video portion of the signal. The prior art discloses methods for simultaneously preventing both video and audio of a television signal from being heard or viewed. The present invention is able to analyze the closed captioned signal of the video portion of either a received television or recorded video signal for undesirable words or phrases. Once a word or phrase is detected, the invention is able to mute the audio portion of the signal without affecting the video image signal. Thus, allowing the viewer to see the video image portion of the signal but not hear the undesirable audio portion.

Another object of the invention is to mute unacceptable words or phrases at the time of a broadcast of a television signal or at the time when a signal has been received from a storage device such as a video cassette recorder. The processing time in which to analyze the closed caption portion of the video signal is minimal. Thus, the muting affect will occur at or near the time in which the video portion of the signal is displayed on the receiver's screen.

Another object of the invention is to provide a device which operates on technology which is currently available. The invention is based on the closed caption data which is embedded into the video portion of television and video signals. Most of the signals transmitted either via the television broadcast networks or other video players embed closed caption data. By utilizing closed caption data, the present invention is able to operate without having the need to develop new standards or devices.

Exemplary patent disclosures showing known closed caption technology are found in U.S. Pat. No. 5,477,214, issued Dec. 9,1995; U.S. Pat. No. 5,543,851, issued Aug. 6,1996; and U.S. Pat. No. 5,572,260, issued Nov. 5, 1996.

It is another object of the present invention to provide a device for processing an electronic signal including video and audio portions corresponding to audible and visible portions of the electronic signal, with said audio portion containing a spoken component related to the audible portion and with said video portion containing an auxiliary information component corresponding to a visible representation of said spoken component of said electronic signal including means for analyzing said auxiliary information component in order to determine if said auxiliary information component contains specific words or phrases and muting a corresponding audio portion of said electronic signal when specific words or phrases are detected within said auxiliary information component.

Another object of the invention is to provide the user with options regarding the level of tolerance regarding the amount of words or phrases which will be subject to the muting aspect of the invention. To some users, a specific word is not offensive while at the same time, that word is considered to be unacceptable. By providing a means for selecting different levels of tolerance, the present invention allows users to utilize the invention pursuant to own personal desires.

Another object of the invention is to provide the user with option regarding the levels of displaying the modified closed captioned data. The present invention allows the viewer the option of seeing the entire modified and unmodified closed captioned text, seeing only the modified closed captioned text during mute, or not seeing any closed captioned text at all.

DETAILED DESCRIPTION OF THE EMBODIMENT

Figure 1:
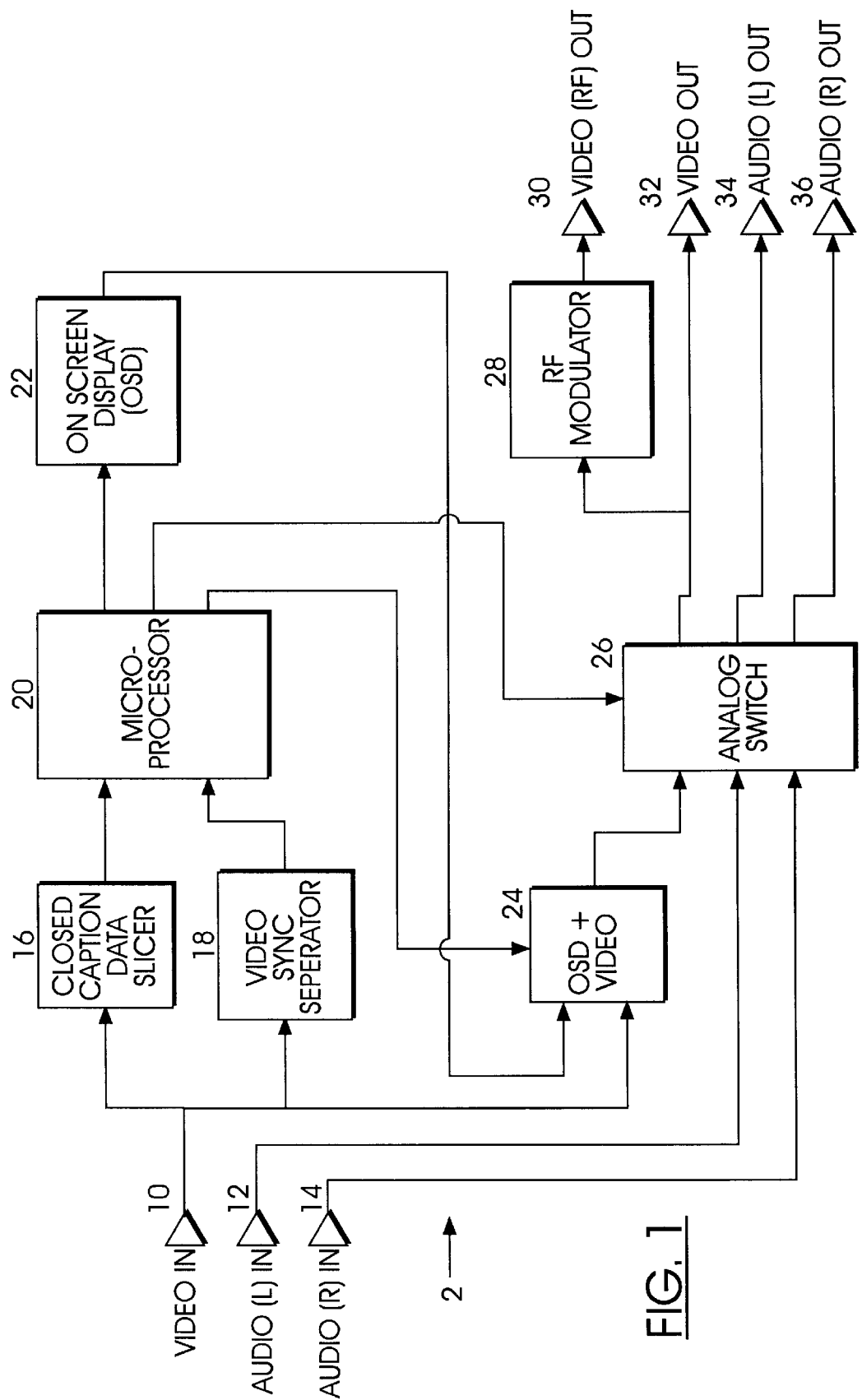
FIGS. 1 is a block diagram of the automatic language filter in accordance with the present invention.

Referring to FIG. 1, the automatic language filter 2, in accordance with the embodiments of the invention, comprises a video input 10 feeding signals to a closed-captioned data slicer 16 and a video-sync separator 18 which in turn feeds to a microprocessor 20 with output to an on-screen display (OSD) 22 and thence to an OSD+VIDEO 24 which also receives the video from video input 10 directly. The OSD+VIDEO 24 output connects through an analog switch 26 to both an RF modulator 28 and then a video (RF) out 30 and directly to a video out 32. An audio (left) input 12, and an audio (right) input 14 are connected through the analog switch 26 (controlled by outputs from microprocessor 20) to audio (left) out 34 and audio (right) out 36, respectively.

When a video portion of the television signal is received in video input 10 the closed-captioned data contained therein is extracted and separated from the video feed by closed-captioned data slicer 16. That information is then analyzed to see if inappropriate words or phrases are contained therein by microprocessor 20. This analysis is performed by comparing the closed caption data against a library of words and phrases stored within the microprocessor's memory. If any word or phrase is determined to be inappropriate a signal is sent to analog switch 26 to mute the audio portion of the signal as received in audio (Left) input 12 and audio (Right) input 14.

After a word or phrase is determined to be inappropriate, the microprocessor then strips the offensive word or phrase from the closed caption data. Preferably a replacement word or phrase is then inserted into the closed caption data.

On-screen display (OSD) 22 responds to signals received from microprocessor 20. OSD+Video 24 then superimposes the signals from OSD 22 upon the video signal received from microprocessor 20. The audio and video portions of the signal are then available to the viewer by the means of video (RF) out 30, video out 32, audio (Left) out 34, and audio (Right) out 36.

Figure 2:
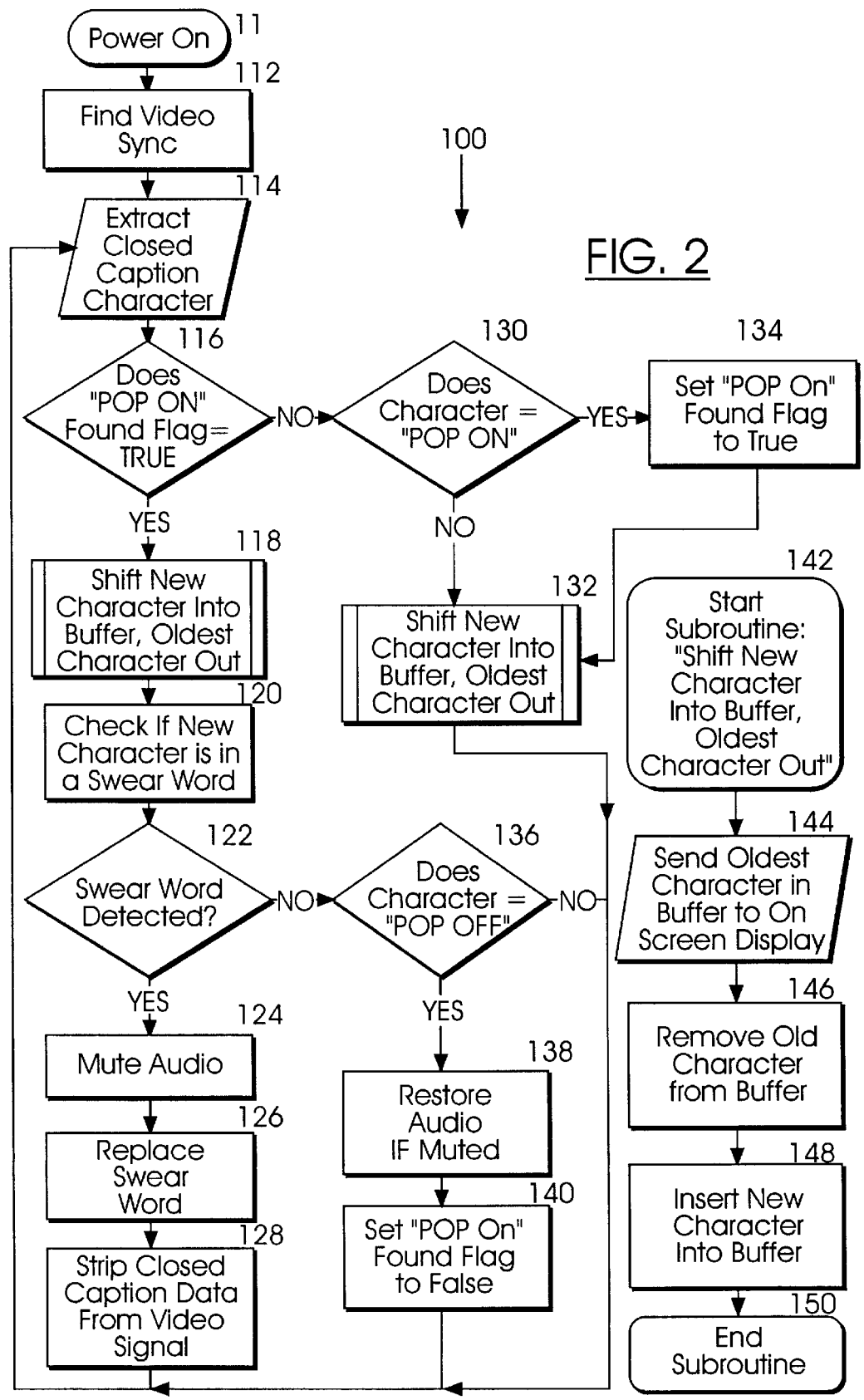
FIG. 2 is a flow diagram of the automatic language filter in accordance with the present invention.

The above described functions of microprocessor 20 can be performed under appropriate software control. FIG. 2 shows a flowchart 100 illustrating an approach to the microprocessor 20 analysis of the signal as received by video in 10. The microprocessor 20 with power on at 11 enters the routine at step 112. The closed caption data is extracted at step 114 by closed captioned data slicer 16.

This data is in the form of a pair of characters. Microprocessor 20 at steps 116, 130, 132 and 134 looks for the specific code POP-ON within these characters. If the code POP-ON is detected, microprocessor compares the specific closed caption data segment with a list of undesirable words or phrases at steps 118, 120 and 122. If an undesirable word or phrase is detected, a command is sent from microprocessor 20 to analog switch 26 to mute audio portion of the signal at step 124. Microprocessor 20 then replaced the undesirable word or phrase with a more acceptable one at steps 126, 142, 144, 146, 148, and 150. The closed caption data is stripped from the video signal by microprocessor 20 at step 128. The routine is reset and audio is restored by receipt of a POP-OFF code in the closed caption data at steps 136, 138, and 140.

In addition to variations and modifications shown or suggested above, other modifications of the illustrated embodiments will be apparent to those skilled in this art and in the closed caption technology, all within the scope of the present invention.

What is claimed:

1. For use in connection with home television video recording, playback, and viewing equipment, apparatus for processing an electronic signal including audio portions and video portions corresponding to audible and visible portions of the electronic signal, with said audio portions containing a spoken component related to the audible portion and with said video portions containing an auxiliary information component providing a visible representation of a respective concurrent spoken component of said electronic signal, said apparatus comprising:

a video input to receive video portion of an electronic signal with said video portion containing a synchronized auxiliary information component corresponding to a visible representation of a concurrent spoken component;

an audio input to receive audio portion of an electronic signal with said audio portion corresponding to said video portion auxiliary information comment;

a video output by which the video portion of an electronic signal is made available to a user of the apparatus;

an audio output by which the audio portion of an electronic signal is made available to a user of the apparatus;

a programmed microcomputer including a data memory for receiving said auxiliary information component from said video portion;

said microcomputer being programmed for analyzing said auxiliary information component in order to determine if said auxiliary information component contains undesirable words or phrases received in said memory;

a switch for muting a corresponding audio portion having a concurrent spoken comment if undesirable words or phrases are detected within an auxiliary information component segment;

said microcomputer being programmed for removing or replacing with another word or phrase any detected undesirable word or phrase found within said auxiliary information segment;

said switch being connected to disable mute at the conclusion of receipt of the modified auxiliary information component segment; and, an on-screen display and video combining unit connected to provide a modified auxiliary information component containing signal to said video output.

2. The apparatus of claim 1, wherein said auxiliary information component is a closed caption signal.

3. The apparatus of claim 1, wherein said electronic signal is a television signal.

4. The apparatus of claim 1, wherein said electronic signal is a signal as received from a storage device such as a video cassette recorder.

5. The apparatus of claim 1, further comprising:

means for selecting different levels of operation with respect to the muting of specific words or phrases, with said different levels include:
(1) a very tolerant level in which no word or phrase will be muted,
(2) a medium tolerant level in which a select amount of undesirable words or phrases will be muted,
(3) a strict level in which the list of specific words or phrases in an amount greater than the medium tolerant level will be muted.

6. The apparatus of claim 1 further comprising a computer program subroutine for displaying of said modified and/or unmodified auxiliary information component at the time an undesirable word or phrase is replaced.

7. The apparatus of claim 6 wherein:

said microcomputer is programmed to selectively provide different levels of operation with respect to the displaying of said modified auxiliary information component which include:
(1) a full captioning level in which all modified or unmodified auxiliary information data is displayed;
(2) a normal captioning level in which only modified words or phrases which represent the replacement words or phrases are displayed; and,
(3) a no captioning level in which no word or phrase is displayed.

8. The apparatus of claim 6, wherein said auxiliary information component is a closed caption signal.

9. The apparatus of claim 7, wherein said auxiliary information component is a closed caption signal.

10. A method of removing undesirable words or phrases from audio and visible television programming having close-captioned text produced by a television set comprising the steps of:

analyzing a synchronized closed-caption component segment of a video signal containing only information corresponding to said audio programming in order to determine if said closed-caption component segment contains undesirable words or phrases;

muting a corresponding concurrent audio segment of an audio signal synchronized with said closed-caption component segment when undesirable words or phrases are detected within said closed-caption component segment of said video signal; and removing or replacing with another word or phrase any detected undesirable word or phrase found within said closed-caption component segment;

whereby all words or phrases predetermined to be undesirable are prevented from being present in the resulting audio signal or in the closed-caption component of the video signal.

11. The method as recited in claim 10 wherein the closed caption characters are processed through a digital computer with a buffer programmed to replace the characters of each undesirable word or phrase with a different character and to combine such modified closed-caption data in the video signal.

12. The method as recited in claim 10 wherein said undesirable words or phrases are stored in at least one library memory in a microcomputer and characters of closed-caption segments are compared with characters of such undesirable words or phrases for detection thereof.

13. The method as recited in claim 12 wherein there is a second library memory in addition to said at least one library memory, said second library memory having additional undesirable words not present in said at least one library memory.

14. The method as recited in claim 11 wherein said undesirable words or phrases are stored in at least one library memory in a microcomputer and characters of closed-caption segments are compared with characters of such undesirable words or phrases for detection thereof.

15. The method as recited in claim 14 wherein there is a second library memory in addition to said at least one library memory, said second library memory having additional undesirable words not present in said at least one library memory.

* * * * *